March 7, 1939. A. D. SIEDLE 2,149,406
ABSORBER FOR REFRIGERATING SYSTEMS
Filed March 9, 1935 2 Sheets-Sheet 1
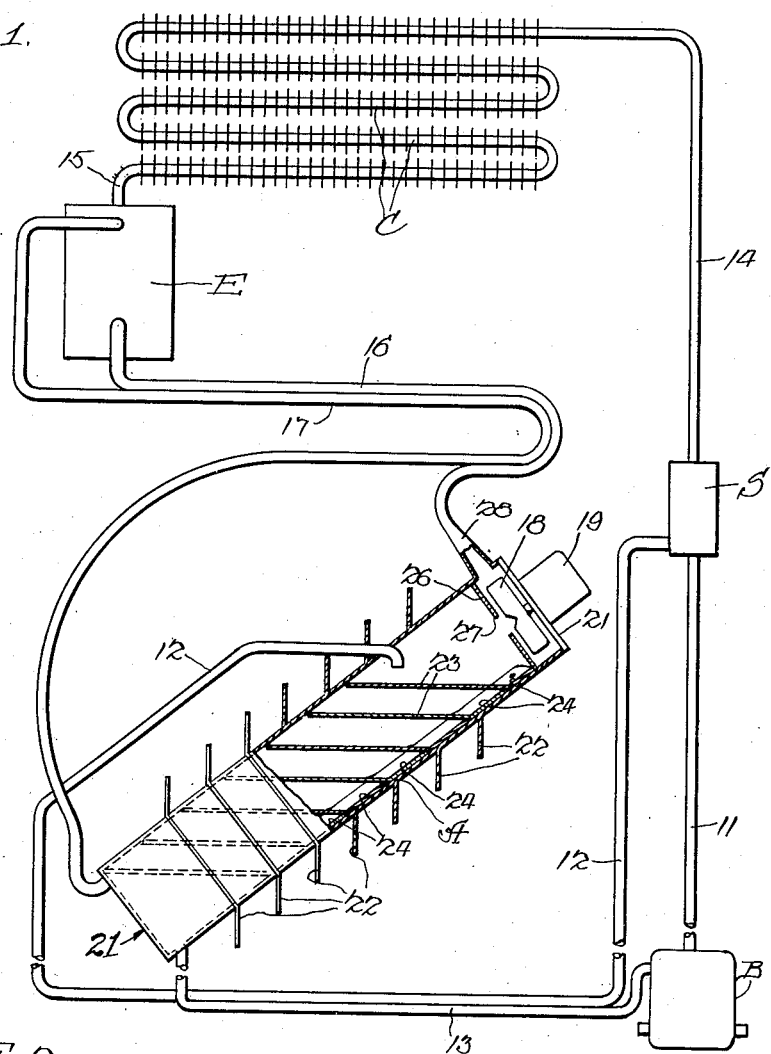
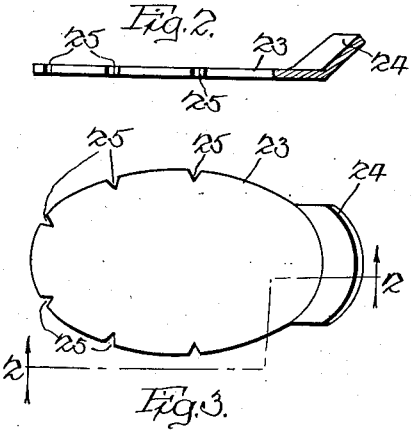
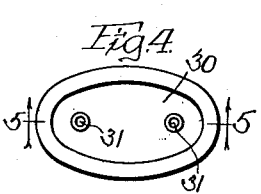
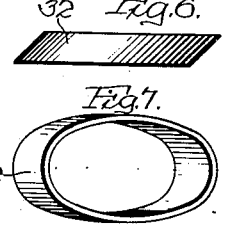
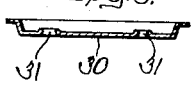
Inventor:
A. D. Siedle.
By Harry S. Demarse
Atty.

March 7, 1939.  A. D. SIEDLE  2,149,406
ABSORBER FOR REFRIGERATING SYSTEMS
Filed March 9, 1935   2 Sheets-Sheet 2

INVENTOR
Arnold D. Siedle.
BY Harry S. Demarse
ATTORNEY

Patented Mar. 7, 1939

2,149,406

UNITED STATES PATENT OFFICE 2,149,406

ABSORBER FOR REFRIGERATING SYSTEMS

Arnold D. Siedle, Canton, Ohio, assignor to The Hoover Company, North Canton, Ohio, a corporation of Ohio Application March 9, 1935, Serial No. 10,159

22 Claims. (Cl. 62—119.5)

This invention relates to continuous absorption refrigerating systems and more particularly to the absorbers used therein and to the combination of the absorbers with various other parts.

In adapting absorption refrigerating systems to small or household refrigerating cabinets the problem of air cooling the absorber is particularly difficult. Previous attempts to solve this problem have not been particularly satisfactory, some of the arrangements proposed involving the addition of an auxiliary heat transfer system and others not being so arranged as to bring sufficient air into contact with the absorber or not providing sufficient heat discharge surface to maintain the absorber at the desired lower temperature.

It is an object of the present invention to overcome certain of the defects mentioned above by providing an air-cooled absorber suitable for use in a refrigerating system particularly in a continuous absorption refrigerating system using inert gas as an auxiliary pressure equalizing means.

It is a further object of the invention to provide means for improving the heat transfer from the fluids in the absorber to the outside atmosphere so as to properly air cool the absorber.

It is still another object of the invention to bring the absorbent and the refrigerant in an absorber into intimate relation so as to improve the absorption of the refrigerant in the absorbing liquid.

Various other objects and advantages reside in certain novel features of the arrangement and construction of parts as will be apparent from the following description, taken in connection with the accompanying drawings in which:

Figure 1 is a diagram of a continuous absorption refrigerating system employing an inert gas as a pressure equalizing medium, the absorber of the system being illustrated in cross section, while the remainder of the figure illustrates the other parts of the system diagrammatically.

Figure 2 is a side view of a tray employed in the absorber illustrated in Figure 1, a portion of the tray being shown in cross section.

Figure 3 is a plan view of the tray illustrated in Figure 2.

Figure 4 is a plan view of a modified form of tray adapted for use in the absorber of Figure 1.

Figure 5 is a cross sectional view on the line 5—5 of the tray of Figure 4.

Figure 6 is a side view of a spacer member adapted for use with the tray illustrated in Figures 4 and 5, and Figure 7 is a plan view of the spacer shown in Figure 6.

Figure 8:
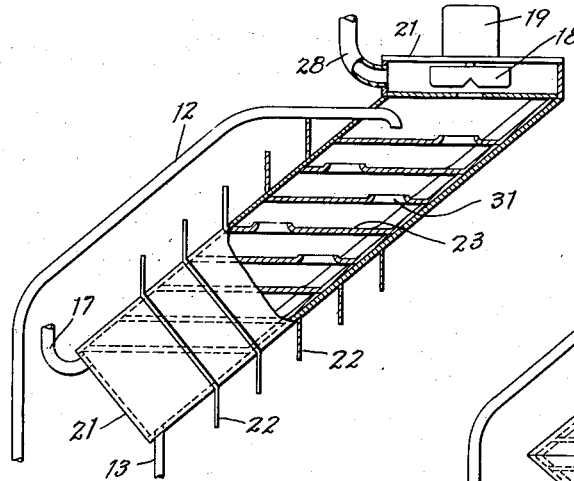
Figure 8 is a side view, in partial cross-section of a modified form of absorber adapted to be used in the system of Figure 1.

Referring to the drawings in detail, and first to the system illustrated in Figure 1, it will be seen that a somewhat conventional continuous absorption refrigerating system is illustrated as consisting of a boiler B, a gas separation chamber S, a condenser C, an evaporator E, and an absorber A, together with various pipes which connect these elements and some of which are in heat exchange relation.

In accordance with the usual arrangement, a gas lift pump conduit 11 connects the boiler and the gas separation chamber and is adapted to convey liquid upwardly therethrough so that it may flow by gravity from the gas separation chamber S through the conduit 12 into the top of the absorber. The liquid conduit 13 in heat exchange relation with the conduit 12 carries absorption liquid from the bottom of the absorber back to the boiler B.

Refrigerant gas generated in the boiler B and in the gas separation chamber S is conveyed to the condenser C through the conduit 14. As the refrigerant condenses in the condenser C it is fed into the evaporator E through the conduit 15. The evaporator E is connected to the absorber A by means of two inert gas conduits in heat exchange relation, designated 16 and 17, the conduit 16 being connected to the bottom of the evaporator and the top of the absorber while the conduit 17 is connected to the top of the evaporator and the bottom of the absorber. Inert gas is caused to circulate through the pipes 16 and 17 and the evaporator and the absorber by means of a small centrifugal fan located in the top of the absorber, as illustrated at 18. The fan is driven by an electric motor 19. The motor 19 may be hermetically sealed in the refrigerating system in accordance with known practices.

As shown in Figure 1 the absorber consists of a cylindrical vessel closed at the top and bottom by means of end plates 21. In accordance with the present invention this absorber is disposed in an inclined position. This disposition of the absorber vessel is important because it enables heat radiating fins 22 to be disposed upon the outside of the vessel in such a way as to cause air currents rising across the absorber by convection to take up considerable heat from the absorber. As illustrated in Figure 1 the heat radiating fins 22 have their upper and lower portions arranged in a vertical position, while their central portion passes laterally across the cylindrical vessel at right angles to its longitudinal dimension. It will be understood that each fin 22 completely surrounds the absorber vessel and is in intimate contact therewith. The shape of the fins is such that air passing upwardly by convection across the cylindrical vessel is caused to change its direction and impinge upon the laterally extending portions. This brings the air in close contact with the fins and promotes rapid heat transfer from the fins to the air.

In accordance with the present invention not only is the advantage just mentioned obtained, but various improvements in absorption on the inside of the vessel result from its inclination.

Located inside of the main vessel of the absorber are a number of horizontally disposed plates or trays 23 which act to retain absorption liquid thereon and cause it to flow through the absorber vessel in a peculiar manner.

In order to space the plates 23 and secure them to the absorber vessel, lugs or tabs 24 are formed integrally therewith. The tabs 24 are bent to the same angle as that of the main absorber vessel and extend from the plate with which they are integral to the plate immediately above. The top of each tab is horizontal and thus makes a line contact with the plate above it. The tab on the top plate 23 may be welded or otherwise integrally secured to the absorber casing. Merely by welding this one plate in position all of the plates 23 are firmly held and locked in the absorber vessel. This simplicity of assembly and manufacture is attained due to the fact that the right hand half of each plate (as viewed in Fig. 1) rests upon the wall of the absorber vessel and is supported thereby. The left hand half of each plate need not be elliptical in order to gain this advantage and it is within the purview of the invention to vary the left hand half to meet the requirements for the passage of fluids around the plates. Similarly, the right hand half need not contact the vessel uninterruptedly but may have notches or openings in its edge if desired. Perhaps the easiest way of assembling the tray 23 in the absorber vessel shown in Figure 1 is by placing the trays therein before the ends 21 are attached. The upper tray 23 may be positioned and the tab 24 thereon welded to the vessel. The lower trays 23 may then be placed in the absorber vessel no attaching means being necessary, and when the absorber vessel is filled with these plates the lower end piece 21 may be welded to the cylinder, this end piece preventing any of the plates 23 from moving downward. Both embodiments of trays illustrated in the drawings are different from any heretofore employed in absorption vessels, in that they are elliptical in shape. The trays shown in Figures 1, 2 and 3 further distinguish from prior constructions in that they are not provided with any holes such as are normally employed to permit the passage of gases and liquids therethrough.

Means must, of course, be provided for permitting the flow of fluid from one end of the absorber to the other since the absorption liquid is intended to flow from the top of the absorber to the bottom and gases are intended to flow from the bottom of the absorber to the top. Heretofore in absorbers employing inert gas large holes must be left in the plate 23 in order to permit the free passage of fluid therethrough. In such constructions, the solution and the gases are not brought into intimate contact and the absorption is not very effective unless the absorbers are large and cumbersome. Further, in such constructions, absorption takes place largely on the plates and heat of absorption must be transferred from the plate to the outside of the absorber largely by metallic conduction. In accordance with the present invention the liquid and gases in the absorber are brought into intimate contact, and this contact may take place right on the wall of the absorber so that a great deal of the heat of absorption need not be transmitted by conduction through the plates 23 at all.

One way of bringing about the intimate contact just referred to is illustrated in Figures 1, 2 and 3. In these figures the left hand end or side of the plate 23 are shown provided with a number of small notches or serrations 25 through which gases may pass upwardly and liquid may pass downwardly along the upper or left hand side of the absorption vessel. Because of the location of these openings and because of the inclination of the absorption vessel the entire inner wall is maintained wet by the liquid, since gravity tends to move the liquid to the right hand side of the vessels after it has passed through the notches 25.

Some fluids may pass around the end of the plate 23 without passing through the serrations 25 and it is contemplated to provide plates without these serrations, but merely with a roughened edge all the way around, or without the edge being very accurately cut so as to permit fluids to pass between the edge of the plate and the wall of the absorber vessel. In any case the tabs 24 provided to space and support the trays 23, will tend to prevent the flow of liquid merely along the bottom wall of the absorber and will tend to cause it to flow to the left of that vessel. In any case, after spilling over a tray the liquid will tend to flow to the right or bottom side of the vessel until it reaches the next lower tray. The construction thus provides excellent means for maintaining the entire inside wall of the absorber vessel wet, in addition to providing an extended surface contact on the trays themselves and, in addition to causing very intimate contact as the liquid and gas flow in opposite directions through the small spaces between the edge of the tray 23 and the wall of the vessel.

Such intimate contact could not be maintained in a practical way unless more difference in pressure in the gases were maintained between the top and bottom of the absorber than is found in the usual constructions, because the friction and surface tension of the liquid around the edge of the trays would prevent the free flow of gas upwardly through the absorber. It is for this reason that the fan 21 is provided at the top of the absorber. In addition to circulating the inert gas between the evaporator and absorber, the fan creates a difference in pressure between the top and bottom of the absorber sufficient to cause the gas to flow upwardly therethrough. Because the quantity of inert gas circulated need not be large, being roughly in the neighborhood of 15 cu. ft. per hour in a household refrigerating unit, it is not necessary to employ a large fan and one sufficient to overcome the friction and surface tension of the liquids referred to above is all that is necessary. Any suitable fan may be employed, the one shown consisting merely of a number of revolving blades. It may be located in a fan chamber formed by the top of the absorber and plate 26 provided with a fan eye 27.

The outlet of the fan chamber is illustrated at 28 as consisting merely of a large pipe connected to the pipe 16 which conveys the gas to the evaporator.

The lower end of the plate 27 may be provided with a small opening (not shown) to drain away any liquid which may collect in the fan chamber and which otherwise might interfere with the operation of the fan.

Certain features of the invention may be advantageously employed without the use of the specific plate or tray 23 illustrated in Figures 1 to 3. The arrangements of trays and the supports therefor illustrated in Figures 4 to 7 show a modified form of the invention in which the trays are provided with the usual openings therein, but which, due to the inclination of the absorber offer certain advantages over the prior art.

As shown in Figures 4 and 5, the trays 30 may be elliptical in shape, the minor axis of the ellipse being equal to the diameter of the absorber vessel cylinder. The trays 30 are preferably dished, as illustrated in Figures 4 and 5, and the openings 31 therein are preferably slightly flanged so as to cause absorption liquid to be retained upon the tray. The openings in the trays may be of any suitable number and all of the trays may be exactly alike since, due to the inclination of the absorber, each tray is offset from the one above it. Thus, liquid dripping through the openings 31 does not fall into the similarly located openings on the tray immediately below but falls on to the body of the tray.

Figure 9:
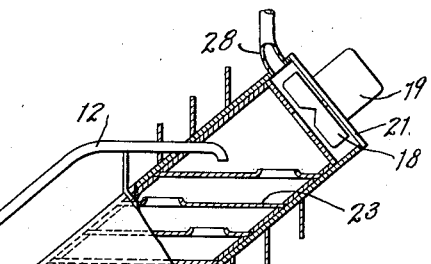
Figure 9 is a similar view of a further modification of the absorber.
Figure 10:
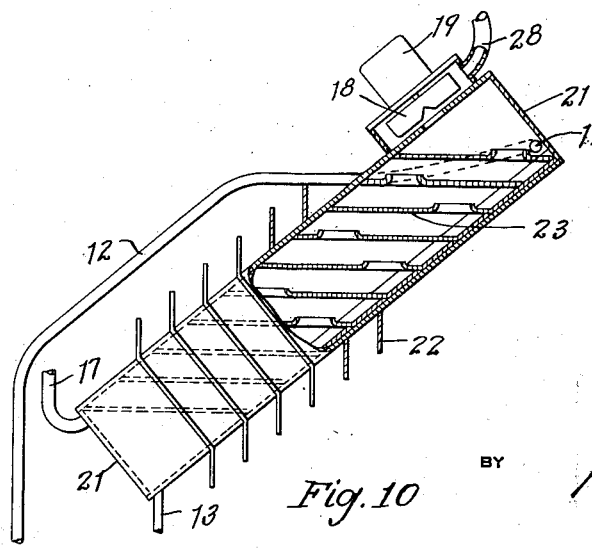
Figure 10 is a similar view of still another modification of the absorber.

An ingenious way of spacing the tray 30 is illustrated by the spacing members 32 shown in Figures 6 and 7. The spacers may be merely slices or segments cut from a tube of metal having an outside diameter slightly smaller than the inside diameter of the main vessel of the absorber. By slashing the tubes at the same angle as that desired for the inclination of the absorber, elliptical spacer members are obtained the top and bottom surfaces of which are offset from one another as illustrated in Figure 6. As in the illustration of Figure 1, if the top spacer member 32 is welded to the wall of the absorber all of the spacers are held in fixed position, being clamped between the upper spacer member and the lower end plate 21 of the absorber vessel.

Where it is necessary to confine refrigerating apparatus to a small space, as along the side or back of a cabinet, an inclined absorber should be so positioned as to extend as far as possible across that space, so as to present the maximum of heat radiating surface. The arrangements of Figures 8, 9 and 10 illustrate various forms of absorbers, designed to accomplish this purpose. The elements of these figures may be the same as those in the absorber of Figure 1 and hence they have been designated with the same reference characters.

The arrangement of Figure 8 may be similar to the absorber of Figure 1 except that the motor 19 and fan 18 are arranged to be disposed upon a vertical axis. This effects a saving in space, as will be apparent by inspection of the figure, and more baffles 23 may be located in the upper part of the absorber vessel.

In Figure 9, the upper part of the absorber is shown offset from the lower part. This may be accomplished by providing an intermediate portion inclined in the opposite direction to that of the main parts, the sections being welded or otherwise secured together. More than one intermediate section may, of course, be provided to obtain as many steps or offsets as may be desired.

The arrangement of Figure 10 shows the motor and fan mounted on the side of the absorption vessel rather than on the end thereof. In this way, more space for baffles is available. The position of the absorber vessel to which the fan chamber is attached may be flattened to provide a fan chamber of the proper shape.

In all of the absorbers illustrated the baffles or trays may be either of the form shown in Figures 2 and 3 or the form shown in Figures 4 and 5. The baffles may be constructed of cast aluminum or be stamped out of steel or aluminum sheets. One advantage of the invention results from the fact that all of the baffles may be the same.

While only a few of the embodiments of the invention have been illustrated and described it is obvious that various changes may be made. If desired, for example, the trays 23 illustrated in Figure 1 need not be closely assembled, and each of the tabs 24 thereon need not support or contact with the plate above the one with which it is integral. It is within the purview of the invention to space the trays 23 some distance apart and in that case each tab 24 may be welded to the wall of the absorber or the trays spaced in some other way. Various other arrangements might be employed without departing from the spirit of the invention, or the scope of the annexed claims.

I claim:

1. In a continuous absorption refrigerating system using an inert gas, the combination of an evaporator, an absorber, gas conduits connecting the evaporator and the absorber, power driven means for circulating the inert gas through said evaporator, absorber and conduits and for creating a slight difference in gas pressure between parts of said absorber, said system being characterized by the fact that said absorber consists of a vessel disposed in an inclined position, air cooling fins located on the outside of said absorber and substantially horizontal trays fixed inside said absorber to provide an extended surface for contact of gas and liquid therein and for bringing the gas circulated through said absorber by said power driven means into intimate contact with liquid therein.

2. In a continuous absorption refrigerating system using an inert gas, the combination of an evaporator, an absorber, gas conduits connecting the evaporator and the absorber, power driven means for circulating the inert gas through said evaporator, absorber and conduits and for creating a slight difference in gas pressure between parts of said absorber, said system being characterized by the fact that said absorber consists of a vessel disposed in an inclined position, air cooling fins located on the outside of said absorber and substantially horizontal trays fixed inside said absorber to provide an extended surface for contact of gas and liquid therein and for bringing the gas circulated through said absorber by said power driven means into intimate contact with liquid therein, said trays being alike and having small openings therein for the passage of liquid therethrough the inclination of said vessel causing the openings in the trays to be offset from each other.

3. In a continuous absorption refrigerating system using an inert gas, the combination of an evaporator, an absorber, gas conduits connecting the evaporator and the absorber, power driven means for circulating the inert gas through said evaporator, absorber and conduits and for creating a slight difference in gas pressure between parts of said absorber, said system being characterized by the fact that said absorber consists of a vessel disposed in an inclined position, air cooling fins located on the outside of said absorber and trays fixed inside said absorber to provide an extended surface for contact of gas and liquid therein and for bringing the gas circulated through said absorber by said power driven means into intimate contact with liquid therein, said trays being alike and having serrations along one side thereof adjacent the upper side of said inclined vesel.

4. In a continuous absorption refrigerating system using an inert gas, an absorber consisting of a vessel disposed in an inclined position, means for circulating absorption liquid through said vessel, power driven means for circulating the inert gas through said absorber and for maintaining a slightly higher gas pressure in one part than in another part of said vessel and substantially horizontal trays fixed in said vessel for providing an extended surface for contact of gas and liquid, said trays being disposed between the parts of the vessel where a difference in gas pressure is maintained and said trays also having small passageways therein for conducting the gas from one part of said vessel to another and for causing the gas to pass in intimate contact with the liquid.

5. In a continuous absorption refrigerating system using an inert gas, an absorber consisting of vessel disposed in an inclined position, means for circulating absorption liquid through said vessel, power driven means for circulating the inert gas through said absorber and for maintaining a slightly higher gas pressure in one part than in another part of said vessel, and trays fixed in said vessel for providing an extended surface for contact of gas and liquid, said trays being disposed between the parts of the vessel where a difference in gas pressure is maintained and said trays being substantially elliptical in shape and extending substantially across said vessel and having small openings therein for conducting the gas from one part of said vessel to another and for causing the gas to pass in intimate contact with the liquid.

6. In an absorption refrigerating system an absorber comprising a cylindrical vessel disposed in an inclined position and elliptically shaped trays fixed at spaced points in said vessel and extending substantially horizontally across the same, said trays having tabs thereon for spacing said trays from each other.

7. In an absorption refrigerating system, an absorber comprising a cylindrical vessel disposed in an inclined position, elliptically shaped trays in said vessel and elliptically shaped members for holding said trays substantially horizontal and in spaced relation to each other.

8. In an absorption refrigerating system, an absorber comprising a cylindrical vessel disposed in an inclined position, heat radiating fins extending laterally across said vessel to air cool the same and means inside said vessel for providing a plurality of horizontal surfaces adapted to retain absorption liquid thereon.

9. In an absorption refrigerating system, an absorber comprising a cylindrical vessel disposed in an inclined position, heat radiating fins extending laterally across said vessel to air cool the same and means inside said vessel for providing a plurality of horizontal surfaces adapted to retain absorption liquid thereon, said means comprising a number of elliptically shaped members extending substantially horizontally across said vessel.

10. In an absorption refrigerating system, an absorber comprising a cylindrical vessel disposed in an inclined position, heat radiating fins extending laterally across said vessel to air cool the same and means inside said vessel for providing a plurality of horizontal surfaces adapted to retain absorption liquid thereon, said means comprising a number of elliptically shaped members extending substantially horizontally across said vessel, each elliptically shaped member having a tab on one side for spacing it from an adjacent elliptically shaped member.

11. In a continuous absorption refrigerating system, an absorber, an evaporator, gas conduits connecting the absorber to the evaporator to provide a path for the flow of gas therebetween, said system being characterized by the fact that said absorber comprises a vessel disposed in an inclined position, trays in said vessel disposed in a substantially horizontal position and means on the outside of said vessel for air cooling the same.

12. In a continuous absorption refrigerating system, an absorber, an evaporator, gas conduits connecting the absorber to the evaporator to provide a path for the flow of gas therebetween, said system being characterized by the fact that said absorber comprises a vessel disposed in an inclined position, trays in said vessel disposed in a substantially horizontal position and means on the outside of said vessel for air cooling the same, said means comprising heat discharging fins extending laterally across said vessel and having substantially vertical portions above and below said vessel.

13. In a continuous absorption refrigerating system, an absorber comprising an inclined vessel, baffles in said vessel extending substantially horizontally across said vessel and gas propelling means associated with said vessel for causing gas to flow across said baffles.

14. An absorption refrigerating system including a boiler and an absorber, means forming an absorption solution circuit including said boiler and absorber, means for circulating absorption solution through said circuit, said absorber comprising a cylindrical vessel disposed in an inclined position and elliptically shaped trays fixed at spaced points in said vessel and extending substantially horizontally across the same.

15. In an absorption refrigerating system, an absorber including a vessel disposed in an inclined position and heat discharge elements on the exterior wall of said vessel, said heat discharge elements extending transversely of said vessel substantially normal to the longitudinal axis thereof and having vertically extending portions above and below said vessel.

16. An absorption refrigerating system comprising an absorption solution circuit including a boiler and an absorber, means for circulating the solution from the boiler to the upper portion of said absorber whereby the solution may flow downwardly through said absorber, a pressure equalizing medium circuit including an evaporator and said absorber, means for supplying vapor generated in said boiler to said evaporator in liquid phase, means for circulating the pressure equalizing medium through said pressure equalizing medium circuit in a direction to flow upwardly through said absorber, said absorber comprising a vessel disposed in an inclined position, means fixed in said vessel for bringing the pressure equalizing medium and absorption solution flowing therethrough into intimate contact, and means for air cooling said vessel.

17. An absorption refrigerating system comprising an absorption solution circuit including a boiler and an absorber, means for circulating the solution from the boiler to the upper portion of said absorber whereby the solution may flow downwardly through said absorber, a pressure equalizing medium circuit including an evaporator and said absorber, means for supplying vapor generated in said boiler to said evaporator in liquid phase, means for circulating the pressure equalizing medium through said pressure equalizing medium circuit in a direction to flow upwardly through said absorber and said evaporator, said absorber comprising a vessel disposed in an inclined position forming a path of flow for the pressure equalizing medium and the absorption solution, means mounted within said vessel in position to obstruct free flow of pressure equalizing medium and solution to bring the pressure equalizing medium and absorption solution flowing therethrough into intimate contact, and means for air-cooling said vessel.

18. An absorption refrigerating system comprising an absorption solution circuit including a boiler and an absorber, means for circulating the solution from the boiler to the upper portion of said absorber whereby the solution may flow downwardly through said absorber by gravity, a pressure equalizing medium circuit including an evaporator and said absorber, means for supplying vapor generated in said boiler to said evaporator in liquid phase, power driven means for propelling the pressure equalizing medium through said pressure equalizing medium circuit in a direction to flow upwardly through said absorber, said absorber comprising a vessel disposed in an inclined position, obstructing means mounted in said vessel extending into the paths of flow of the pressure equalizing medium and the absorption solution to form bodies of the solution having extended surfaces and to agitate the pressure equalizing medium to bring the pressure equalizing medium and the solution flowing therethrough into intimate contact, and means for air cooling said vessel.

19. An absorption refrigerating system comprising an absorption solution circuit including a boiler and an absorber, means for elevating the solution from the boiler to the upper portion of said absorber whereby the solution may flow downwardly through said absorber by gravity, a pressure equalizing medium circuit including an evaporator and said absorber, means for supplying vapor generated in said boiler to said evaporator in liquid phase, means for circulating the pressure equalizing medium through said pressure equalizing medium circuit in a direction to flow upwardly through said absorber, said absorber comprising a plurality of vessels disposed in an inclined position and lying in a common plane, baffling means fixed in said vessels for impeding the flow of absorption solution and pressure equalizing medium to bring the pressure equalizing medium and absorption solution flowing therethrough into intimate contact, and means for air cooling said vessels.

20. An absorption refrigerating system comprising an absorption solution circuit including a boiler and an absorber, means for elevating the solution from the boiler to the upper portion of the absorber whereby the solution may flow downwardly through the absorber by gravity, a pressure equalizing medium circuit including an evaporator and said absorber, means for supplying vapor generated in said boiler to said evaporator in liquid phase, means for circulating the pressure equalizing medium through said pressure equalizing medium circuit in a direction to flow upwardly through said absorber and said evaporator whereby refrigerant vapor is added to the upwardly flowing pressure equalizing medium in the evaporator and is removed from the upwardly flowing pressure equalizing medium in the absorber, said absorber comprising a plurality of alternately oppositely extending connected sections disposed in an inclined position, means fixed in said sections for bringing the pressure equalizing medium and absorption solution flowing therethrough into intimate contact, and means for air cooling said sections.

21. An absorption refrigerating system comprising an absorption solution circuit including a boiler and an absorber, means for circulating the solution from the boiler to the upper portion of said absorber whereby the solution may flow downwardly through said absorber by gravity, a pressure equalizing medium circuit including an evaporator and said absorber, means for supplying vapor generated in said boiler to said evaporator in liquid phase, means for circulating the pressure equalizing medium through said pressure equalizing medium circuit in a direction to flow upwardly through said absorber, said absorber comprising a plurality of serially connected inclined conduits providing a tortuous path for the flow of pressure equalizing medium and absorption solution, means inserted in said conduits for forming pools of absorption solution and for preventing direct unobstructed flow of the pressure equalizing medium through the conduits to bring the pressure equalizing medium and absorption solution flowing therethrough into intimate contact, and means for air cooling said conduits.

22. An absorption refrigerating system comprising an absorption solution circuit including a boiler and an absorber, means for circulating the solution from the boiler to the upper portion of said absorber whereby the solution may flow downwardly through said absorber, a pressure equalizing medium circuit including an evaporator and said absorber, means for supplying vapor generated in said boiler to said evaporator in liquid phase, means for circulating the pressure equalizing medium through said pressure equalizing medium circuit in a direction to flow upwardly through said absorber, said absorber comprising a plurality of sections extending downwardly alternately in opposite directions from the upper end thereof, a plurality of flow obstructing elements mounted in said sections in the path of flow of the pressure equalizing medium and absorption solution to form bodies of absorption solution having extended surfaces in contact with the pressure equalizing medium flowing through the absorber, and means for air cooling said sections.

ARNOLD D. SIEDLE.